UNITED STATES PATENT OFFICE.

SIDNEY WILLIAMS, OF SAN FRANCISCO, CALIFORNIA.

PROCESS OF EXTRACTING PRECIOUS METALS FROM THEIR ORES.

1,056,311.

Specification of Letters Patent.

Patented Mar. 18, 1913.

No Drawing.

Application filed July 8, 1912. Serial No. 708,235.

*To all whom it may concern:*

Be it known that I, SIDNEY WILLIAMS, a citizen of the United States, and a resident of the city and county of San Francisco and State of California, have invented certain new and useful Improvements in Processes of Extracting Precious Metals from Their Ores, of which the following is a specification.

The invention relates to a process of extracting gold, silver, platinum and other precious metals from their ores.

The object of the invention is to provide a rapid, cheap, and efficient process for extracting precious metals from their ores and recovering the same.

According to my invention, the ore in a ground or pulverized condition is mixed with a suitable quantity of solution and agitated in the presence of mercury. The solution has the effect of maintaining the mercury in a bright active state, and of freeing the gold and increasing its affinity for the mercury. The solution consists of potassium sulfate and superphosphate dissolved in water. The potassium sulfate and superphosphate are mixed together in powdered or solid form and the mixture is dissolved in a suitable quantity of water preparatory to mixing it with the ore. The superphosphate may be a single superphosphate containing substantially 18% $P_2O_5$ or it may be a double superphosphate containing substantially 42% $P_2O_5$. When single superphosphate is used, the ingredients are mixed in the proportion of one part of potassium sulfate and substantially two parts of single superphosphate, and when the double superphosphate is used, the ingredients are mixed in the proportion of substantially one part of potassium sulfate and one part of double superphosphate. When the mixture is to be used in extracting gold or other metals from the ore, it is dissolved in a suitable amount of water, the proportion of the water used depending upon the character of the ore. I have found that for ordinary ores, the mixture should be dissolved substantially in the proportion of one part of the mixture to twenty-four parts of water, although for heavy sulfid ores the strength of the solution may be increased to one part of the mixture to nineteen parts of water.

The ore to be treated is ground or pulverized to a suitable fineness and is mixed with a suitable quantity of the solution. The mixture is then agitated in the presence of mercury or plates coated with mercury which rapidly collect the metals as they are released from the ore. The effect of the solution on the ore is to put the metal in a free state and to increase its affinity for mercury, so that it is immediately collected by the mercury, from which it is recovered by the usual processes.

I claim:

1. The process of separating precious metals from their ores which consists in mixing the ore in a ground state with a solution of potassium sulfate and superphosphate in water and agitating the mass in the presence of mercury.

2. The process of separating precious metals from their ores which consists in mixing the ore in a finely divided state with a solution formed of substantially equal parts of potassium sulfate and double superphosphate in water and agitating the mass in the presence of mercury.

3. The process of separating and recovering precious metals from their ores which consists in mixing the ore in a finely divided state with a solution formed of one part potassium sulfate, one part double superphosphate, and substantially twenty-four parts of water and agitating the mass in the presence of mercury.

In testimony whereof, I have hereunto set my hand at San Francisco, California, this 3rd day of July, 1912.

SIDNEY WILLIAMS.

In presence of—
H. G. PROST,
P. S. PIDWELL.

---

Copies of this patent may be obtained for five cents each, by addressing the "Commissioner of Patents, Washington, D. C."